UNITED STATES PATENT OFFICE.

CARL OSCAR MÜLLER, OF BASLE, SWITZERLAND, ASSIGNOR TO L. DURAND, HUGUENIN & CIE., OF SAME PLACE, ST. FONS, FRANCE, AND HÜNINGEN, GERMANY.

BLUE-BLACK DYE AND PROCESS OF MAKING SAME.

SPECIFICATION forming part of Letters Patent No. 628,721, dated July 11, 1899.

Application filed April 6, 1899. Serial No. 711,904. (Specimens.)

*To all whom it may concern:*

Be it known that I, CARL OSCAR MÜLLER, chemist, a subject of the King of Saxony, and a resident of Basle, Switzerland, have invented new and useful Improvements in the Manufacture of Blue-Black Coloring-Matters for Dyeing Mordanted Wool, of which the following is a clear, full, and exact specification.

I have found that a blue-black disazo coloring-matter can be obtained containing the tetrazo derivative of paraphenylenediamin, which resists light and fulling and which is therefore of great industrial valve if one of the components, coupled with the said tetrazo derivative, is formed by an orthocarboxylised phenol of the benzene series—such as salicylic acid and its homologues—while the other component, coupled with the said tetrazo derivative, is constituted by the 1.8.4 dioxynaphtalenesulfonic acid. The coloring-matter thus obtained produces upon wool which is chromed either before or after dyeing blue-black tints that are exceedingly resisting to light and fulling.

For the manufacture of this coloring-matter the best way is to go out from the amidobenzeneazosalicylic acid.

Example: Twenty-seven kilos of para-amidobenzeneazosalicylic acid (obtained either by combination of paranitro-diazobenzene with salicylic acid and the subsequent reduction of the resulting combination or by combination of the diazo derivative of monoacet-paraphenylenediamin with salicylic acid and subsequent saponification of the resulting combination) are transformed in the known manner into the diazo derivative. This diazo derivative is run into a solution of thirty kilos of sodium dioxynaphtalenesulfonate, (OH:OH:$SO_3$H=1:8:4,) which solution has been rendered alkaline by means of carbonate of soda in order that the mass may remain alkaline up to the end of the reaction. The coloring-matter formed is then precipitated by an addition of common salt, and is pressed and dried. It dyes chromed wool in black tints very resisting to light and fulling and constitutes in dry state a black powder, which dissolves in water with a violet and in concentrated sulfuric acid with a blue coloration.

The salicylic acid may be replaced by cresotinic acid, (ortho-oxy-toluic acid.)

What I claim is—

1. A process for the manufacture of coloring-matters for dyeing mordanted wool, consisting in the production of coloring-matters in which the tetrazo derivative of paraphenylenediamin is coupled on the one hand with an orthocarboxylised phenol of the benzene series and on the other hand with the 1.8.4 dioxynaphtalenesulfonic acid.

2. A process for the manufacture of a coloring-matter for dyeing mordanted wool, consisting in coupling one molecule of the diazo derivative of para-amidobenzeneazosalicylic acid with one molecule of the 1.8.4 dioxynaphtalenesulfonic acid.

3. As a new article of manufacture, the herein-described dyestuff which contains the tetrazo derivative of paraphenylene-diamin coupled on the one hand with salicylic acid and on the other hand with the 1.8.4 dioxynaphtalenesulfonic acid and which dyes chromed wool in blue-black tints exceedingly resisting to light and fulling, constitutes in dry state a black powder which dissolves in water with a violet and in concentrated sulfuric acid with a blue coloration.

In witness whereof I have hereunto signed my name, this 27th day of March, 1899, in the presence of two subscribing witnesses.

CARL OSCAR MULLER.

Witnesses:
GEORGE GIFFORD,
AMAND RITTER.